United States Patent [19]

Müller

[11] Patent Number: 4,736,819

[45] Date of Patent: Apr. 12, 1988

[54] SPLASH LUBRICATION SYSTEM FOR MOTOR VEHICLE TRANSMISSIONS

[75] Inventor: Erich Müller, Öhringen-Cappel, Fed. Rep. of Germany

[73] Assignee: ZWN Zahnradwerk Neuenstein GmbH & Co., Neuenstein, Fed. Rep. of Germany

[21] Appl. No.: 857,751

[22] PCT Filed: Jul. 3, 1985

[86] PCT No.: PCT/DE85/00224

§ 371 Date: Feb. 28, 1986

§ 102(e) Date: Feb. 28, 1986

[87] PCT Pub. No.: WO86/00678

PCT Pub. Date: Jan. 30, 1986

[30] Foreign Application Priority Data

Jul. 6, 1984 [DE] Fed. Rep. of Germany ....... 3424907

[51] Int. Cl.[4] .......................... F01M 9/06; F16N 7/26; F16N 7/28; F16N 11/10
[52] U.S. Cl. .................................. 184/6.12; 184/13.1; 184/39; 123/196 AB; 74/467
[58] Field of Search ................. 184/6.1, 6.3, 6.4, 6.12, 184/11.1, 11.2, 13.1, 39; 123/196 AB, 196 R; 74/467, 468; 236/101 R; 60/572

[56] References Cited

U.S. PATENT DOCUMENTS

| 2,439,053 | 4/1948 | Moore | 184/39 |
|---|---|---|---|
| 2,513,476 | 7/1950 | Griffith | 60/572 |
| 2,551,274 | 5/1951 | MacDuff | 60/572 |
| 2,669,096 | 2/1954 | MacDuff | 60/572 |
| 3,246,934 | 4/1966 | Locke | 384/76 |
| 3,300,135 | 1/1967 | Slater | 236/34.5 |
| 3,977,600 | 8/1976 | Sheets | 236/101 R |
| 4,075,912 | 2/1978 | Schaefer | 137/393 |
| 4,169,519 | 10/1979 | Hirt | 184/6.3 |
| 4,217,926 | 8/1980 | Van Gorder | 123/196 AB |
| 4,407,125 | 10/1983 | Parsons | 60/592 |
| 4,526,054 | 7/1985 | Ehrlinger | 184/6.3 |
| 4,541,735 | 9/1985 | Abu-Isa | 236/101 R |

FOREIGN PATENT DOCUMENTS

| 1576398 | 8/1967 | Fed. Rep. of Germany . |
|---|---|---|
| 2317007 | 4/1973 | Fed. Rep. of Germany . |
| 2903617 | 1/1979 | Fed. Rep. of Germany . |
| 3208100 | 3/1982 | Fed. Rep. of Germany . |
| 854747 | 5/1939 | France . |
| 2443002 | 11/1979 | France . |
| 54618 | 4/1980 | Japan ............................. 123/196 AB |

Primary Examiner—Carlton R. Croyle
Assistant Examiner—Jane E. Obee
Attorney, Agent, or Firm—McAulay, Fields, Fisher, Goldstein & Nissen

[57] ABSTRACT

A splash lubrication system is provided for motor vehicle transmissions and comprises an oil sump (42) in the bottom portion of a case (30). The case (30) accommodates a transmission shaft (31) provided with gears (34 to 37) which are immersed in the oil at least partly when the said oil sump (42) is filled completely. In order to prevent the synchronizing mechanism from being blocked by cold and, consequently, very viscous oil in the presence of extremely low operating conditions—a condition which could lead to unsynchronized faulty gear shifting operations and, thus, damage to the transmission, the oil sump (42) is connected with a cavity (33) into which oil is drawn from the oil sump (42) under low operating temperature conditions of the transmission. To this end, preferably, an expansion body (38) is arranged in a cavity (33) in a transmission shaft (31) which contracts under cold conditions, and the cavity (33) is connected with the oil sump (42).

20 Claims, 2 Drawing Sheets

SPLASH LUBRICATION SYSTEM FOR MOTOR VEHICLE TRANSMISSIONS

The present invention relates to a splash lubrication system for motor vehicle transmissions comprising a case forming an oil sump in its bottom portion, and a transmission shaft provided with gears which are immersed in the oil at least partly when the said oil sump is filled completely.

Splash lubrication systems of this type are generally known in modern transmissions, in particular motor vehicle transmissions. Due to the rotation of the gear immersed in the oil of the oil sump, the oil is whirled upwardly and the transmission case is filled with an oil mist which ensures proper lubrication of all points required to be lubricated.

However, experience has shown that under extreme operating conditions, in particular in the presence of extremely low temperatures, such a splash lubrication system is connected with certain disadvantages because under extremely low temperatures the transmission oil assumes a relatively high viscosity and the splashing and/or the drag moment demanded from the transmission due to the very viscous oil tends in particular to brake the synchronizing mechanisms of the transmission so heavily that unsynchronized shifting operations may occur. The latter may, however, cause considerable damage to the transmission because, generally, modern motor vehicle transmissions are not designed to stand unsynchronized faulty shifting without damage as the synchronizing mechanisms of modern transmissions normally ensure smooth gear changes.

Now, it is the object of the present invention to improve a splash lubrication system of the type described above in such a manner that unsynchronized faulty gear shifting is prevented even under extremely low temperatures, without any disadvantageous consequences for the shifting behavior under normal operating temperatures.

This object is achieved according to the invention by an arrangement in which the oil sump is connected with a cavity to which oil is transferred from the oil sump when the transmission operates at a low operating temperature.

This measure ensures that the lubricating effect of the splash lubrication system is reduced under low temperature conditions and that, in particular, the very viscous oil which is the result of low temperatures, can no longer enter the synchronizing mechanisms and, thus, prevent the synchronization of the transmission parts to be brought into engagement with each other during the gear shift operation, while under normal operating temperature conditions the full oil quantity is again available so that any rattling and shattering of the transmission is avoided safely.

The oil may be transferred to the oil sump from the cavity and vice versa by means of a pump or the like. However, in a particularly preferred embodiment of the invention, the oil is transferred by suction because this method does not require any separate motor-driven elements.

In a particularly preferred embodiment of the invention, the filling level is reduced by suction far enough to ensure that the gears do not get immersed in the oil at a predetermined lower operating temperature limit.

This measure offers the advantage that once the temperature drops below the said limit temperature, no oil mist is produced at all in the transmission case. This condition can be accepted for the gear flanks that normally have to be lubricated because the lower temperature limit will be exceeded again after a very short period of time, typically one minute or a few minutes, and sufficient lubrication will then be re-established. The synchronizing mechanisms, however, are not wetted during this short interval with whirled-up oil and are, therefore, permitted to operate in a perfect manner.

According to a further improvement of the invention, the cavity is filled partly with a material exhibiting a high expansion temperature coefficient.

This measure provides the advantage that no separate oil pumps or the like are required and that the material to be firmly arranged in the cavity may be one requiring no further maintenance.

A particularly favorable effect is achieved in this embodiment when the material is contained in an elastic bag and is of a type which vaporizes when the said operating temperature limit is exceeded.

This measure offers the advantage that a behavior that could almost be described as a "switching behavior" is encountered at the said lower operating temperature limit in that when the temperature is above the said limit the oil sump is normally filled and when the temperature drops below the said limit temperature, the filling level of the oil sump drops at once to a value at which the gears are prevented from getting immersed in the oil so that the before-described advantages are achieved. On the other hand, it is ensured by this measure that once the limit temperature is exceeded, the normal splash lubrication effect is available immediately so that the reduced filling level exists in effect only as long as the temperature range requiring such reduction prevails.

According to the invention, the material used in this case may be a chlorofluorocarbon of the type commercially available under the name of Frigen. This material is produced on an industrial scale and, thus, relatively cheap.

In one embodiment of the invention, the cavity is arranged laterally of the case and connected with the oil sump via a passage.

This feature provides the advantage that the splash lubrication system according to the invention can be given a very compact design because the transmission case has to be extended only by a relatively small lateral annex.

According to another embodiment of the invention, the cavity is the cavity of a hollow transmission shaft.

This feature provides on the one hand the essential advantage that practically no additional attachments have to be provided and that, in particular, the outer dimensions of the transmission are not increased. On the other hand, this feature offers the advantage that the hollow transmission shaft, being free from transmission oil at normal operating temperature, is considerably lighter in weight than a solid transmission shaft so that the moment of inertia of the transmission is reduced whereby the accelerating power is increased and the fuel consumption is reduce correspondingly.

In a preferred arrangement of this embodiment, the material is contained in an elongated bag because this permits optimum filling and emptying of the cavity in the hollow transmission shaft.

In a variant of the embodiments using a hollow transmission shaft the connection between the cavity and the oil sump can be established by a liquid-tight revolving coupling and a line. This feature permits the variable filling level in the oil pan to be varied either by suction alone or else also by pumps or the like arranged in the line.

In still another variant of these embodiments, however, the cavity is connected with the oil sump via radial channels passing through the shaft jacket and/or through the shaft jacket and gears.

It is an advantage of this feature that this arrangement can do without the relatively expensive revolving coupling and that instead the exchange of the oil between the cavity in the transmission shaft and the oil sump can be effected automatically.

According to a particularly preferred arrangement of this embodiment, the interior cross-section of the channels is sized in such a manner that the oil can no longer flow through the channels when its temperature drops to the low operating temperature.

It is the advantage of this arrangement that when the motor is started under cold conditions the oil contained in the cavity of the transmission shaft will initially remain there to keep the oil level in the oil sump at a low value. Later, when the transmission has warmed up to normal operating temperature, the oil becomes liquid enough to flow through the then sufficiently large cross-section of the channels and into the oil sump, under the effect of centrifugal forces, so as to raise the filling level in the oil sump.

According to still another variant, valves are provided in the channels to block the latter when the temperature drops to the low operating temperature.

This feature provides the same advantages as described in connection with the last-mentioned embodiment, except that here the function of the cross-section of the channels which are too narrow for letting very viscous oil pass, is fulfilled by the valves.

Finally, still another variant is preferred in which valves are arranged in the channels for blocking the latter when they occupy an upwardly inclined position during rotation of the transmission shaft The valves may, in particular, comprise a check element for closing the valve in the inclined position under the effect of gravity.

This feature provides the additional surprising advantage than when the transmission has come to a standstill, the channels projecting upwardly from the oil are closed by the valves so that as the transmission cools down oil is drawn from the oil sump into the cavity of the transmission. When the transmission is permitted to cool down completely, in particular to a particularly low ambient temperature, the cavity in the transmission shaft may be filled almost completely, while the filling level of the oil sump drops to a correspondingly low value, far below the filling level in the cavity of the transmission shaft.

The measure to provide the valve with a gravity-actuated check element provides the advantage that the latter does not hinder normal operation of the transmission because the centrifugal force encountered will keep the valve constantly open as long as the transmission shaft revolves.

Other advantages of the invention will become apparent from the description and the attached drawing.

The invention will be described in detail in the following specification with reference to the drawing in which.

Figures 1, 2:
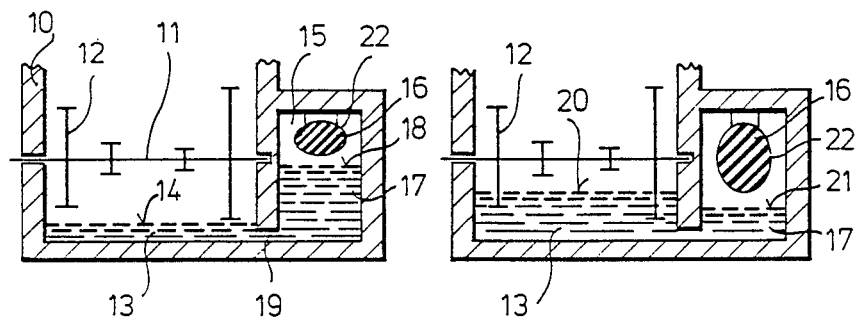
FIG. 1 shows a diagrammatic representation of a splash lubrication system according to the invention, at a very low operating temperature.
FIG. 2 is a representation similar to that of FIG. 1, but at normal operating temperature.

In FIG. 1, a case of a transmission housing a transmission shaft 11 with gears is indicated diagrammatically by reference numeral 10. The lower part of the said case 10 forms an oil sump 13. In FIG. 1, the filling level 14 of the said oil sump is so low that the gears 12 do not get immersed in the oil.

A closed cavity 15 arranged laterally of the case 10 accommodates an expansion body 16. The cavity 15 further contains an oil supply 17 with—in the operating condition shown in FIG. 1—a relatively high filling level 18. The cavity 15 is connected with the oil sump 13 via a passage 19. In the condition shown in FIG. 1, the splash lubrication system has a relatively low operating temperature, and the expansion body 16 is its extreme contracted condition. Accordingly, a certain portion of the oil has been drawn into the closed cavity 15 which is connected with the outside only via the passage 19. The interior dimensions of the cavity 15, in particular the dimensions and the expansion temperature coefficient of the expansion body 16, are sized in such a manner that when the operating temperature drops below a given lower limit temperature of, say, −30° C., the expansion body 16 will contract to such a degree that the resulting filling levels 14, 18 ensure that the gears 12 do not get immersed in the oil sump 13.

When the driver starts his vehicle under these conditions, the gears 12 and the synchronizing means not shown in drawing FIG. 1 are not splash-lubricated so that the synchronizing means cannot be blocked by the oil which is extremely viscous under these temperature conditions, but is in a position to ensure normally synchronized shifting operations in spite of the low temperature.

However, after a very short operating time of, for instance, one or only a few minutes, the transmission has already warmed up sufficiently to cause the expansion body 16 to expand considerably as shown in FIG. 2. Due to the expansion of the expansion body 16, the oil supply 17 is pressed back through the passage 19 and into the area of the oil sump 13, which means that the filling level 21 drops and the filling level 20 of the oil sump 13 rises. Finally, the normal operating condition of the splash lubrication system shown in FIG. 2 is obtained, where the gears 12 are immersed at least partly in the oil sump 13.

It goes without saying that the invention is not limited to arrangements where the oil is drawn and pressed from the oil sump into the cavity and vice versa in response to the temperature, as shown in FIGS. 1 and 2. Instead of using a temperature-controlled suction mechanism it is of course also possible to employ an oil pump or the like varying the filling level in the oil sump in response to the temperature.

Figure 3:
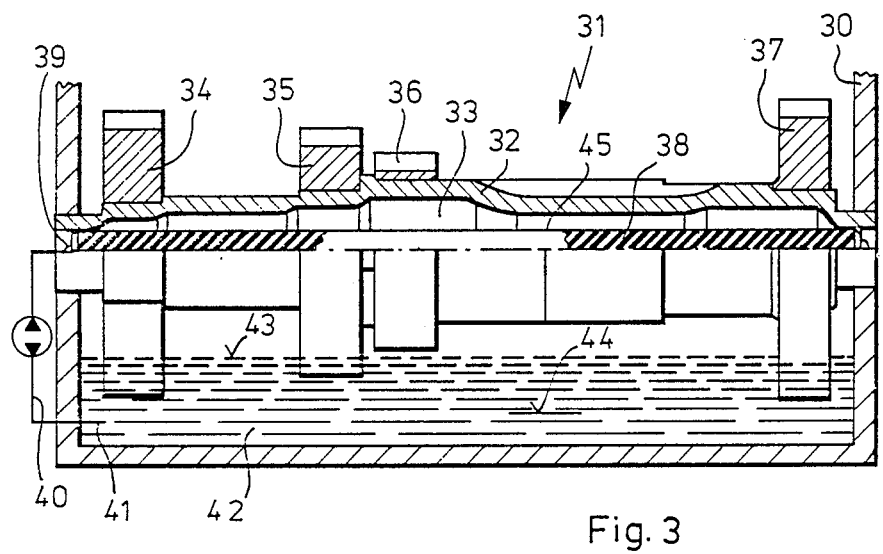
FIG. 3 shows an embodiment of a splash lubrication system according to the invention using a hollow transmission shaft.

In the embodiment shown in FIG. 3, a case 30 accommodates a transmission shaft 31 taking the form of a hollow shaft composed of a jacket 32 enclosing a cavity 33 of the shaft 31. The jacket 32 carries gears 34, 35, 36, 37. The cavity 33 contains an elongated expansion body 38. The volume of the cavity 33 which is not taken up by the expansion body 38 is connected with an oil sump 42 in the bottom area of the case 30 via a liquid-tight revolving coupling 39, a line 40 and a connection pipe 41. The filling level of the splash lubrication system under normal operating conditions is designated by 43, while reference numeral 44 designates the filling level desired when the transmission is very cold.

The operation of the embodiment shown in FIG. 3 corresponds largely to that of the embodiment shown in FIGS. 1 and 2, except that direct use is made of the cavity 33 of the transmission shaft 31. Under low temperature conditions, the expansion body 38 will contract sufficiently to cause oil from the oil sump 42 to flow through the connection pine 41, the line 40 and the revolving coupling 39 into the cavity 33 of the transmission shaft 31 so that when a lower operating temperature limit is reached, the filling level 44 of the oil sump 42 ensures that none of the gears 34 to 37 gets immersed in the oil.

Now, when the temperature of the transmission shown in FIG. 3 rises above the lower limit temperature after the vehicle has been started, the expansion body 38 is caused to expand, and the oil stored in the cavity 33 is pressed back into the oil sump 42.

In order to make the pumping action of the expansion body 16 or 38 as efficient as possible, it is of course necessary that the expansion body be made from a material having an extremely high expansion temperature coefficient. According to a particularly preferred arrangement, the material may be a chlorofluorocarbon because this material vaporizes in a temperature range which is particularly suited for the present application so that the increase or reduction of the volume of the body occurs suddenly at a given limit temperature. It is, thus, possible to impart to the splash lubrication system according to the invention a "switching characteristic" which ensures that the splash lubrication system is "switched on" or "switched off" when a predetermined lower operating temperature limit is reached.

Especially when a vaporizing expansion body is used, the latter may, according to the invention, be contained in an elastic bag as designated by 22 in the embodiment shown in FIGS. 1 and 2, and by 45 in the embodiment of FIG. 3. The bag 45 of the embodiment shown in FIG. 3 exhibits, preferably, an elongated shape so that the entire volume of the cavity 33 can be influenced and a particularly efficient pumping effect can be achieved.

Figure 4:
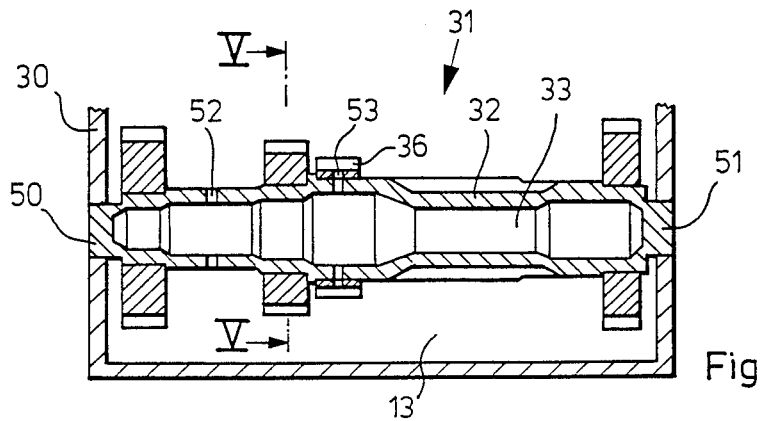
FIG. 4 is a representation similar to that of FIG. 3, but simplified, and showing a variant of a splash lubrication system according to the invention.

The embodiment shown in FIG. 4 uses a splash lubrication system very similar to that shown in FIG. 3, except that the transmission shaft 31 is closed on the shaft ends 50, 51 and that, accordingly, no revolving coupling 39, as shown in FIG. 3, is provided. The connection between the cavity 33 and the oil sump 13 is established in the embodiment shown in FIG. 4 by radially extending channels 52, 53 distributed preferably in groups about a circumferential line. The channel 52 passes through the shaft jacket 32 in a position where no gears are arranged, while the channel 53 passes through the shaft jacket 32 and a gear 36, ending there at the tooth base.

Figures 5A, 5B:
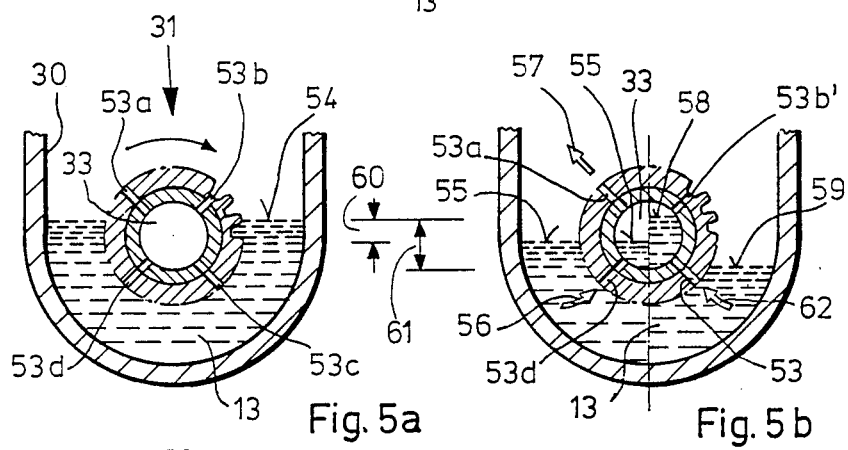
FIGS. 5a and 5b show sections along line V—V, under different operating conditions and for different embodiments of the splash lubrication system shown in FIGS. 5a and 5i.

The splash lubrication system according to FIG. 5 permits to implementation of different variants and operating modes which will be described hereafter with reference to FIGS. 5a and 5b showing each a section along line V—V in FIG. 4.

Referring now to the representation of FIG. 5a, it can be seen that, for example, four channels 53a, 53b, 53c and 53d are distributed about a circumferential line. The representation of FIG. 5a shows the transmission in operating condition, as indicated by an arrow representing the revolving transmission shaft 31, at normal operating temperature. The cavity 33 is empty because due to the effect of the centrifugal force all the oil has flown from the cavity 33 into the oil sump 13, through the sufficiently wide channels 53a to 53d.

In this operating condition, with the transmission shaft 31 revolving, a—for example—first filling level is obtained.

Now, when the transmission comes to a standstill, for example because the vehicle equipped with the transmission has been parked, the said first filling level 54 will drop to the second filling level 55 indicated in the left half of FIG. 5b. For, when the transmission shaft 31 is stationary, the oil will flow in the direction of arrow 56, for example through the channel 53d, to fill part of the cavity 33. As a result, equal second filling levels 55 are obtained in the oil sump 13 and the cavity 33 because the two spaces communicate with each other. In order to permit the oil to enter the channel 53d at 56, a certain amount of air present in the cavity 33 has first to leave the cavity 33 through the channel 53a in the direction of arrow 57.

According to a variant of the splash lubrication system shown in the right half of FIG. 5b, a channel 53b' can be blocked in this operating condition. The oil will now initially flow through the channel 53c in the direction indicated by arrow 62 until the condition shown in the left half of FIG. 5b is obtained. However, with the channel 53b closed, the residual air in the cavity 33 and the oil will now contract as the transmission cools down so that additional oil is drawn in through the channel 53 in the direction of arrow 62. When the temperature has reached its lowest level, a third filling level 58, which is higher than the second filling level is obtained in the cavity 33, while a fourth filling level 59 lower than the before-mentioned two filling levels 55 and 63 is obtained in the oil sump 13.

Between FIGS. 5a, and 5b, the amount by which the first filling level 54 existing during operating can be lowered is indicated once more by 60 for the embodiment shown in the left half of FIG. 5b and by 61 for the embodiment shown in the right half of FIG. 5b.

Figures 6A, 6B:
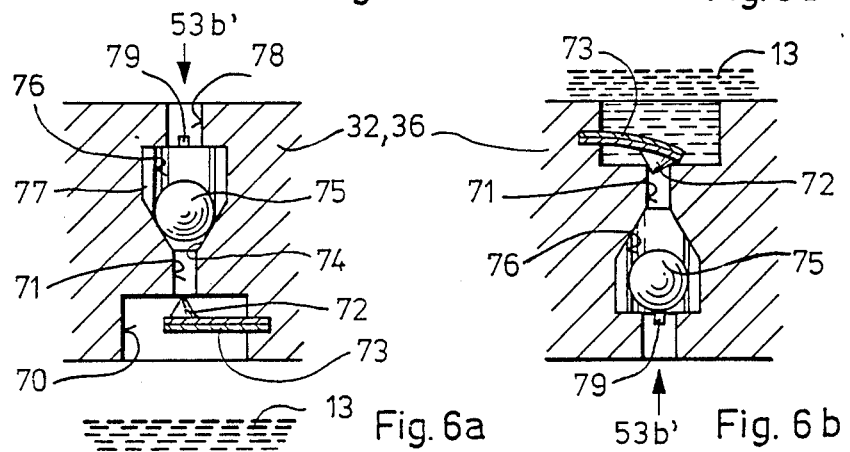
FIGS. 6a and 6b show a diagrammatic representation of a valve of the type suited for use in an embodiment of the splash lubrication system according to the right half of FIG. 5b.

FIGS. 6a and 6b illustrate valves of the type that can be used for closing the channel 53b' in the right half of FIG. 5b.

FIG. 6a shows the operating condition illustrated in the right half of FIG. 5b, where the valve occupies an upwardly inclined position and the temperature of the transmission is relatively high. In contrast, FIG. 6b shows the operating condition, where due to a corresponding rotation of the transmission shaft 31, the valve assumes a downwardly inclined position, and the temperature of the transmission is in addition relatively low.

As can be seen in FIG. 6a and 6b, the channel 53b' consists —regarded from below in FIG. 6a—of a relatively large first bore which is followed by a relatively narrow channel 71. In the transition between the first bore 70 and the channel 71, a temperature-responsive valve is provided consisting—in the extremely simplified representation—of a valve cone 72 and a bimetallic holder 73. The upper end of the channel 71 is followed by a valve cone 72 tapering upwardly and ending in a second bore 76 forming a runway for a ball 75. The bore 76 is provided with lateral longitudinal grooves 77 extending past the ball 75. At its upper end, the bore 76 is followed by a narrower channel 78 with a traverse 79 extending across the bore 78.

The arrangement shown in FIGS. 6a and 6b serves serves two different purposes.

On the one hand, the temperature-controlled valve formed by the opening of the channel 71, the valve cone 72 and the bimetallic holder 73 serves to retain the oil in the cavity 33 of the transmission shaft 31 under very low operating temperature conditions, while in the presence of the usual, relatively high operating temperature conditions the valve cone 72 is lifted off, and the valve is opened, due to a corresponding distortion of the bimetallic holder 73, as shown in FIG. 6a, so that the operating condition represented in FIG. 5b is obtained where the oil is urged out of the cavity 33 of the transmission shaft 31 by centrifugal force However, when the transmission has been stopped and the cavity 33 becomes filled with oil in one of the manners that have been described above or will be described further below, and the operating temperature has dropped to a very low level, the bimetallic holder 73 will move into the position shown in FIG. 6b, in which the channel 71 is blocked by the valve cone 72. Now, the oil contained in the cavity 33 is retained therein, and the low filling level 55 or 59 in the oil sump 13 is maintained until the transmission has once more assumed an operating temperature which causes the valve 71/72/73 to open again.

The function of the valve consisting of the ball 75 and the valve seat 74 is independent of the process described before. In the position shown in FIG. 6a, which corresponds to the operating condition illustrated in the right half of FIG. 5b, this valve serves to permit further oil to be drawn into the cavity 33 by closing the connection between the cavity 33 and the surrounding outer space above the oil sump 13. To this effect, the ball 75 drops under gravity on to the valve seat 74, thus blocking the channel 71. The valves on the lower half of the transmission shaft 31 are, however, in the position shown in FIG. 6b in which the ball 75 rests on the traverse 79 and oil is permitted to be drawn into the oil sump 13 through the channel 78, the longitudinal grooves 77, the channel 71 and the first bore 70. It is of course clear that as long as oil is being drawn in in this manner, the valve cone 72 remains in the position in which it is lifted off the channel 71, contrary to the position shown in FIG. 6b, and that the valve closes only when the final temperature has been reached.

During normal operation of the transmission, as shown in FIG. 5a, the ball 75 also occupies the position shown in FIG. 6b because in this position it is constantly urged against the traverse 79 by centrifugal force.

What is claimed is:

1. Method for adjusting the filling level of an oil sump for splash lubricating systems of synchronized motor-car gear-boxes, including:
    transferring a partial amount of the oil from the oil sump in a gear-box housing into an enclosure having an oil receiving cavity, the enclosure and the oil receiving cavity being connected to the housing; and
    solely altering the filling-level of the oil sump as a function of the operating temperature in the gear-box housing by transferring the partial amount of oil from the oil sump automatically at low temperatures into the cavity and by retransferring the oil from the cavity at higher temperatures to the oil sump.

2. Apparatus for adjusting the filling-level of an oil sump of a splash lubricating system of synchronized motor car gear-boxes, comprising:
    an enclosure having a cavity;
    means for transferring a partial amount of oil in an oil sump from a gear-box housing into said enclosure having said cavity; and
    an expansion body in said cavity, said expansion body being variable in volume, and being at least partially composed of a substance which has a large temperature coefficient of expansion so that the transfer and re-transfer, respectively, of the oil is achieved solely by temperature-dependent contraction and expansion, respectively, of the expansion body.

3. Apparatus as claimed in claim 2, wherein said expansion body is partially filled with said substance having a large temperature coefficient of expansion.

4. Splash lubrication system for a transmission for motor vehicles comprising:
    a housing (10; 30), said housing (10; 30) having a bottom portion, and being provided with an oil sump (13; 42) to receive lubricating oil;
    an enclosure having a cavity, said enclosure being fluidly connected with said housing to permit the transfer of oil to and from said oil sump to and from said cavity;
    said transmission comprising a transmission shaft (11, 31) and gears (12; 34 to 37) provided on said shaft (11; 31), said gears (12; 34 to 37) being housed in said housing and being partly immersed in said oil when said oil sump (13; 42) is connected with said cavity (15; 33); and
    means for transferring a partial amount of said oil of said oil sump (13; 42) in said gear box housing into said cavity (15; 33) when said transmission operates at an operating temperature below a preset low temperature value; and
    variable volume expansion means in said cavity, said expansion means having a large temperature coefficient of expansion so that transfer and re-transfer of the oil between said housing and said enclosure is achieved solely by temperature dependent contraction and expansion of the expansion body.

5. Splash lubrication system according to claim 4, wherein the enclosure with said cavity (15) is arranged laterally of the housing (10) and is connected with the oil sump (13) via a passage (19).

6. Splash lubrication system according to claim 4, wherein said variable volume expansion means is made from a substance having a high expansion temperature coefficient.

7. Splash lubrication system according to claim 4, wherein said variable volume expansion means is a substance with a chlorofluorocarbon material.

8. Splash lubrication system according to claim 4, including pump means for transferring the oil.

9. Splash lubrication system as claimed in claim 4, wherein said variable volume expansion means is a substrate having a large temperature coefficient of expansion.

10. Splash lubrication system according to claim 4, wherein the oil is transferred by suction.

11. Splash lubrication system according to claim 10, wherein the variable volume expansion means is a body filled with a substrate having the large temperature coefficient of expansion.

12. Splash lubrication system according to claim 10, wherein the filling level (14, 20; 43, 44) is reduced by suction far enough to ensure that the gears (12; 34 to 37) do not get immersed in the oil at a pre-determined lower operating temperature limit.

13. Splash lubrication system according to claim 12, wherein the material is contained in an elastic bag (22; 45) and is of a type which vaporizes when the said operating temperature limit is exceeded.

14. Splash lubrication system according to claim 7, wherein the material used is a chlorofluorocarbon.

15. Splash lubrication system according to claim 4, wherein the cavity (33) forms part of a hollow transmission shaft (31) and is connected with the oil sump (42) via a liquid-tight revolving coupling (39) and a line (40).

16. Splash lubrication system according to claim 15., wherein the cavity (33) is connected with the oil sump (13) via radial channels (52, 53) passing through the shaft jacket (32) and/or through the shaft jacket (32) and gears (36).

17. Splash lubrication system according to claim 16, wherein the interior cross-section of the channels (52, 53) is sized in such a manner that the oil can no longer flow through the channels (52, 53) when its temperature drops to the low operating temperature.

18. Splash lubrication system according to claim 16, wherein valves are provided in the channels (53b') to block the latter when the temperature drops to the low operating temperature.

19. Splash lubrication system according to claim 16, wherein valves are arranged in the channels (53b') for blocking the latter when they occupy an upwardly inclined position during rotation of the transmission shaft (31).

20. Splash lubrication system according to claim 19, wherein a check element (74, 75) closes the valve under the effect of gravity in the inclined position.

* * * * *